(12) United States Patent
Last et al.

(10) Patent No.: US 9,693,011 B2
(45) Date of Patent: Jun. 27, 2017

(54) UPGRADED IMAGE STREAMING TO LEGACY AND UPGRADED DISPLAYS

(71) Applicant: BARCO N.V., Kortrijk (BE)

(72) Inventors: Stijn Last, Rekkem (BE); Patrick Decherf, De Hann (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 14/930,045

(22) Filed: Nov. 2, 2015

(65) Prior Publication Data

US 2017/0127014 A1    May 4, 2017

(51) Int. Cl.
*H04N 7/01* (2006.01)
*H04N 19/152* (2014.01)
*H04N 19/115* (2014.01)

(52) U.S. Cl.
CPC ......... *H04N 7/0117* (2013.01); *H04N 7/0125* (2013.01); *H04N 19/115* (2014.11); *H04N 19/152* (2014.11)

(58) Field of Classification Search
CPC ....... H04N 19/119; H04N 21/2343–21/23439; H04N 19/04; H04N 7/18–7/183; H04N 13/0048; H04N 7/12; H04N 21/2662; H04N 19/112; H04N 21/6118–21/6125; H04N 19/40; H04N 7/125
See application file for complete search history.

(56) References Cited

U.S. PATENT DOCUMENTS

| | | | | |
|---|---|---|---|---|
| 2007/0263937 A1* | 11/2007 | Rizko | ............. | H04N 21/23892 382/232 |
| 2007/0285519 A1* | 12/2007 | Ahn | ........................ | H04N 5/76 348/208.6 |
| 2008/0273591 A1* | 11/2008 | Brooks | ................ | H04N 7/1675 375/240.01 |
| 2011/0149023 A1* | 6/2011 | Kamiya | ............. | H04N 13/0059 348/42 |
| 2013/0314495 A1* | 11/2013 | Chen | ................... | H04N 13/0048 348/43 |
| 2014/0168512 A1* | 6/2014 | Suh | ....................... | H04N 21/845 348/441 |
| 2014/0286415 A1* | 9/2014 | Kang | ................... | H04N 19/597 375/240.12 |

OTHER PUBLICATIONS

International Search Report and Written Opinion for corresponding International Application No. PCT/EP2016/076442, Feb. 24, 2017.

* cited by examiner

*Primary Examiner* — Michael Teitelbaum
(74) *Attorney, Agent, or Firm* — Renner, Otto, Boisselle & Sklar, LLP (57) ABSTRACT

A display system and method including (a) at least one input source encoding images to be displayed in a first format with a first resolution and in a second format with a second resolution higher than the first; (b) a first and second display for displaying images with the first and second resolution, respectively; and (c) a shared resource network linking the at least one input source with the first and second displays. The images encoded in the first format with the first resolution are sent over the shard resource network through a first cable. A first part of each image encoded in the second format with the second resolution is sent over the shared resource network through the first cable. A second part of each image encoded in the second format with the second resolution is sent over the shared resource network through a second cable.

22 Claims, 5 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V |P|X| CC  |M|   PT      |       Sequence Number             |
+-+-+-+-+-+-+-+-+-+-+-+-+-+-+-+-+-+-+-+-+-+-+-+-+-+-+-+-+-+-+-+-+
|                          Time Stamp                           |
+-+-+-+-+-+-+-+-+-+-+-+-+-+-+-+-+-+-+-+-+-+-+-+-+-+-+-+-+-+-+-+-+
|                            SSRC                               |
+-+-+-+-+-+-+-+-+-+-+-+-+-+-+-+-+-+-+-+-+-+-+-+-+-+-+-+-+-+-+-+-+
|    Extended Sequence Number   |            Length             |
+-+-+-+-+-+-+-+-+-+-+-+-+-+-+-+-+-+-+-+-+-+-+-+-+-+-+-+-+-+-+-+-+
|F|      Line No              |C|           Offset              |
+-+-+-+-+-+-+-+-+-+-+-+-+-+-+-+-+-+-+-+-+-+-+-+-+-+-+-+-+-+-+-+-+
|            Length             |F|          Line No            |
+-+-+-+-+-+-+-+-+-+-+-+-+-+-+-+-+-+-+-+-+-+-+-+-+-+-+-+-+-+-+-+-+
|C|          Offset             |
+-+-+-+-+-+-+-+-+-+-+-+-+-+-+-+-+-+-+-+-+-+-+-+-+-+-+-+-+-+-+-+-+
                   Two (partial) lines of video data
+-+-+-+-+-+-+-+-+-+-+-+-+-+-+-+-+-+-+-+-+-+-+-+-+-+-+-+-+-+-+-+-+
```

UPGRADED IMAGE STREAMING TO LEGACY AND UPGRADED DISPLAYS

FIELD OF INVENTION

The present invention relates to methods, systems, encoders and decoders streaming of streaming ne e.g. updated higher resolution images over legacy networks as well as software for carrying out any of the methods.

BACKGROUND

In operating rooms at present, integration is the key to efficient surgical workflow. AV (Audio Visual) systems still in use in many operating rooms have limited integration possibilities, demand extensive cabling, and result in cluttered and complicated configurations. This complexity presents challenges in the surgical environment, where flexibility and scalability are critical to operational efficiency.

A fully IP-centric solution for image distribution in the operating room is now usually adopted in more recent ORs (Operating Rooms). In those ORs, the system architecture has been specifically designed to meet the performance demands and the unique requirements of the surgical suite, such as high-quality imaging, ultra-low latency, and real-time communication.

Examples of such networked based surgical systems or networked operating rooms are described in e.g. WO 2007/073420 "Streaming Video Network System" and EP 2081124A2 "Networked based endoscopic surgical system".

Figure 1:
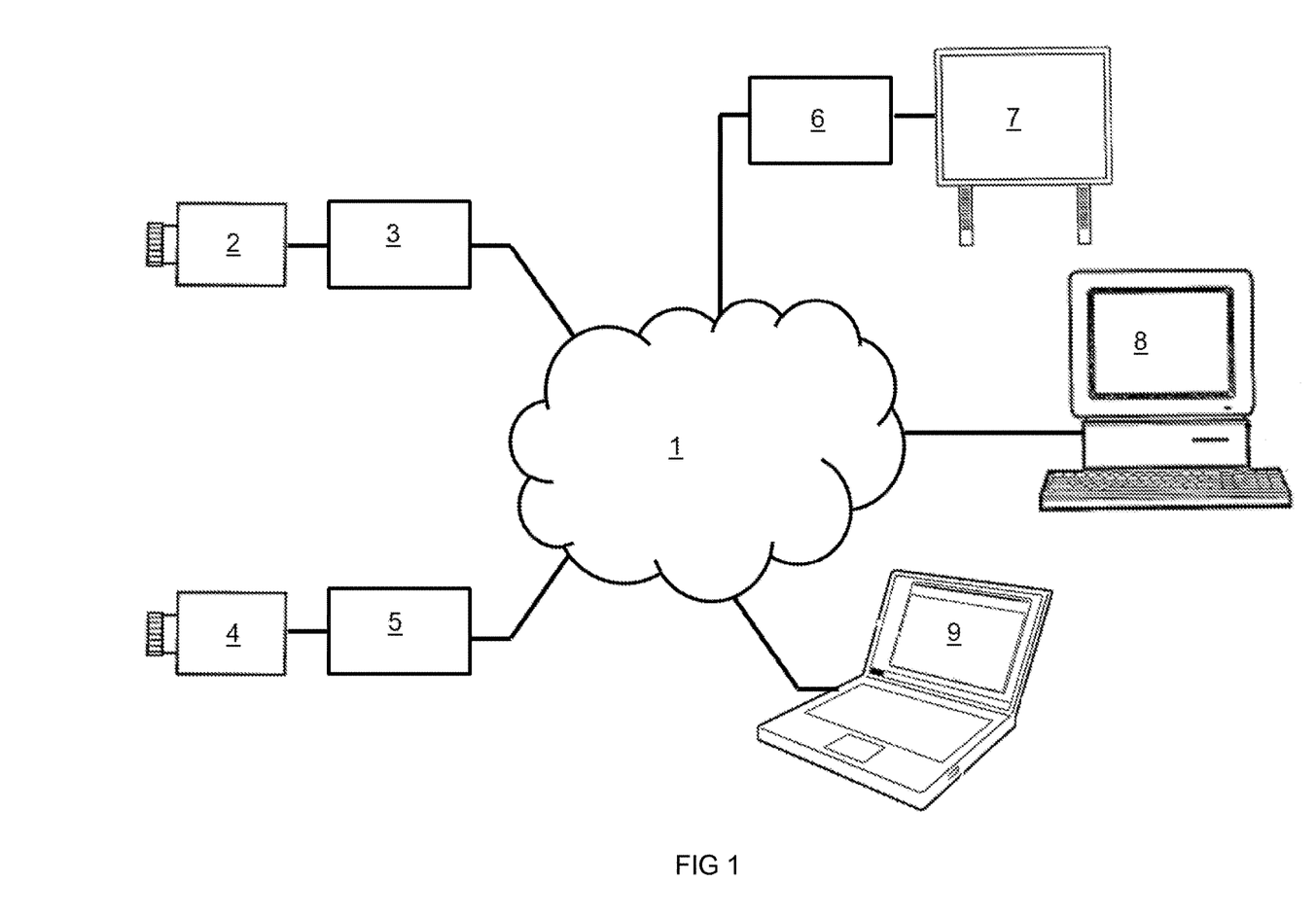
FIG. 1 shows a known video network display system.

When an operating room is installed, it usually integrates off-the-shelf equipment of the latest generation. For instance, around 2005, the format of images transferred over the network would have been Full HD (e.g. 1080p). In the example of FIG. 1, full HD cameras 2 and 4 would generate full HD images for a full HD display 7. AV-to-IP encoders 3 and 5 (like e.g. the MNA-120 supplied by Barco NV, Belgium) take in baseband video data and convert these to IP streams for transportation over a standard high bandwidth IP network 1. The decoder 6 reconverts these raw IP packets to DVI video signals for display on display 7. The IP streams can also be received by computers and/or servers like 8 for e.g. for archiving.

In some networked based solution like Nexxis™ from Barco NV, Belgium, a "management suite" on a computer 9 allows management and monitoring of the IP streams between the encoders and decoders, facilitating configuration and management Integrated within a user interface. The "management suite" software allows distribution of high quality video, audio, keyboard and mouse towards any destination with a single touch on the screen. For instance, the packets generated by the encoder 3 can be directed towards the decoder 6 in order to display the images captured by camera 2 on display 7 while the packets generated by encoder 5 are directed towards computer 8 for display and storage on that computer. This can be done with a user interface where it merely suffices to drag a source (icon associated with e.g. camera 2) and drop it on a sink (e.g. icon associated with display 7).

Figure 2:
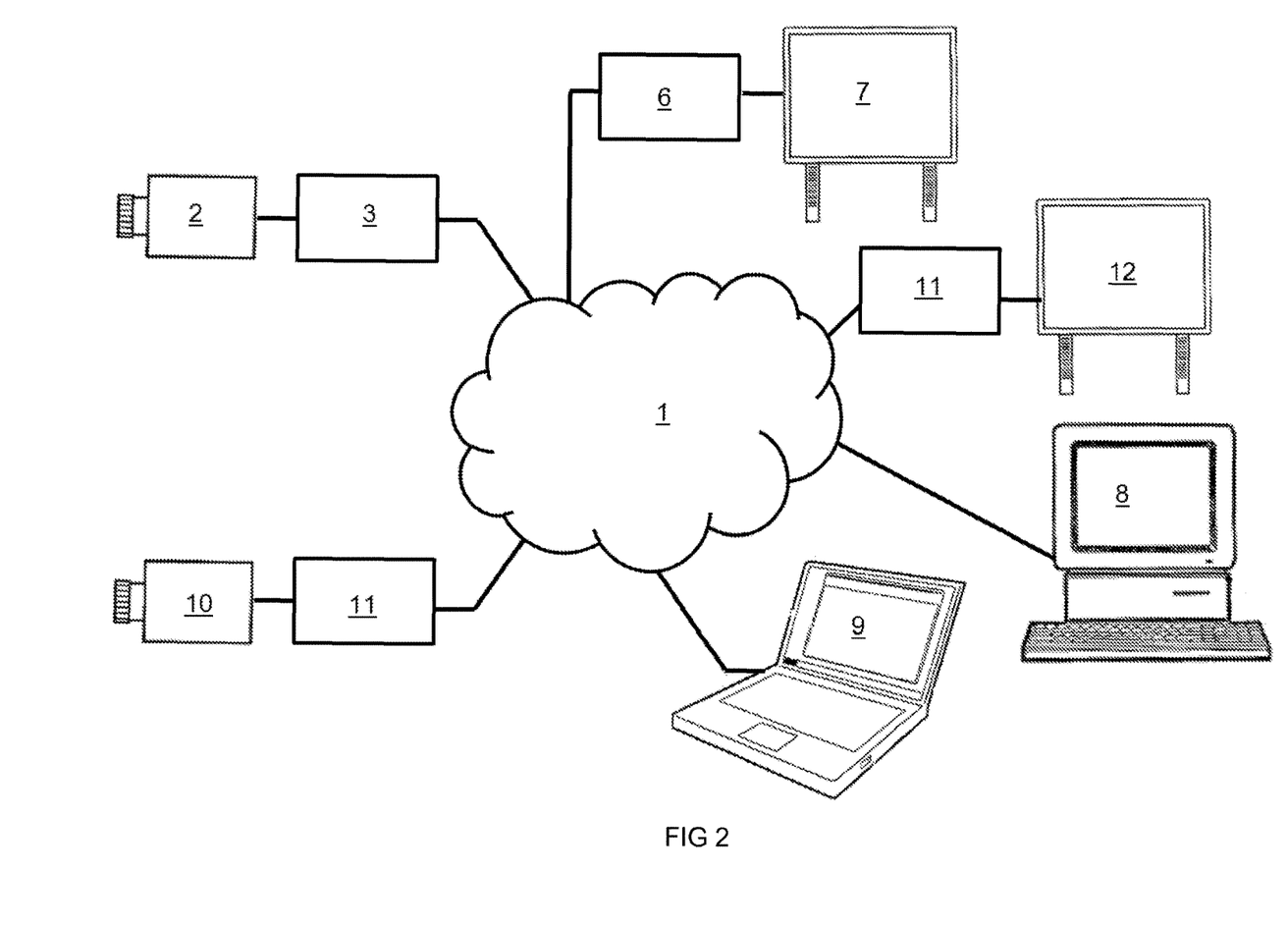
FIG. 2 shows another known video network display system

As the operating room is upgraded, new equipment can be added as illustrated on FIG. 2. The new equipment can be more advanced than the one originally installed. For instance the HD camera 4 of FIG. 1 can be replaced by a state of the art camera 10 capturing images of higher resolutions (e.g. a 4K camera). New displays like display 12 capable of displaying images at a higher resolution are connected to the network 1 to take advantage of the increased resolution of camera 10. 4K resolution, also called 4K, refers to a display device or content having horizontal resolution of the order of 4,000 pixels. Several 4K resolutions exist in the fields of digital television and digital cinematography. In the movie projection industry, Digital Cinema Initiatives (DCI) is the dominant 4K standard. The DCI 4K resolution standard is defined as 4096×2160 pixels (256:135, approximately a 1.9:1 aspect ratio).

If the 4K content generated by camera 10 is directed to HD display 7 problems may occur. Indeed, while a 4K display might be able to display HD content, an HD display having been manufactured without taking the existence of the 4K format into account might be incapable of displaying a 4K image at all.

One solution to avoid having to replace the encoders, decoders and/or displays of earlier generations when equipment designed to operate with images of a different format, is to let both image formats (HD/1080p and 4K in this example) coexist in one way or another. 1080p (also known as Full HD or FHD and BT.709) is a set of HDTV high-definition video modes characterized by 1080 horizontal lines of vertical resolution and progressive scan, as opposed to interlaced. The term usually assumes a widescreen aspect ratio of 16:9, implying a resolution of 1920×1080 (2.1 megapixel) and is often marketed as "Full HD".

The drawback of that solution is that the amount of data to be streamed increases.

If HD-1080p images were originally streamed at a rate of 30 or 60 frames per second and without compression, it could be done with a single 10 Gb per second link.

If HD-1080p images are to be streamed at the same rate in parallel with 4K images without compression, two or more 10 Gb per second links are required.

In US20130314495 "Multi-layer backwards-compatible video delivery for enhanced dynamic range and enhanced resolution formats", the two different formats (e.g. 4K and HD) are encoded together into a first and a second stream making use of base and enhanced layers. The first stream is sufficient to reconstruct the first format (e.g. HD) while the first and second streams are both used to reconstruct the second format (e.g. 4K). Use of base and enhanced layers in this way requires decoding and reconstruction to retrieve the original video signals. A possible issue with the technique disclosed in this document is the "lag" introduced by the decoding and reconstruction of the first and/or second format. Such a lag can be incompatible to allow proper eye to hand coordination if e.g. a surgeon is operating in remote (i.e. the patient and the surgeon are not at the same geographical location and a robot controlled by the surgeon is used).

Depending on the resolution and the frame rate of the images to be streamed, one may exceed the bandwidth of a single cable. For instance, the bandwidth required to stream the same images in 4K (8 million pixels) and HD (2 million pixels) formats is well above that of a single 10 GE cable (also known as 10 Gb Ethernet i.e. a cable whose bandwidth allows transmission of 10 gigabits per second).

A solution is required to allow the upgrade of existing network based display systems with as little modifications as possible. In particular a solution is required to allow transfer of higher resolution images using the existing network based display systems with as little modifications as possible.

SUMMARY OF THE INVENTION

It is an object of the present invention to provide methods and means including software and computer program products to allow the distribution of image data in different formats over a network to which displays are connected to be able to display the image data received in at least one of the different formats.

In a first aspect of the invention, a display system for displaying image data for use with (a) at least one input source encoding images to be displayed in a first format with a first resolution and in a second format with a second resolution higher than the first; (b) a first display for displaying images with the first resolution and a second display for displaying images with the second resolution; the system comprising (c) a shared resource network for linking the at least one input source with the first and second displays; wherein the images encoded in the first format with the first resolution are sent over the shared resource network through a first limited bandwidth link such as for example for at least a part of the network a first cable and wherein a first part of each image encoded in the second format with the second resolution is sent over the shared resource network through the first limited bandwidth link such as for example the first cable and a second part of each image encoded in the second format with the second resolution is sent over the shared resource network through a second limited bandwidth link such as for example for at least a part of the network a second cable.

In a second aspect of the invention, a display system for displaying image data for use with a shared resource network for linking at least one input source with first and second displays, the system comprising (a) the at least one input source encoding images to be displayed in a first format with a first resolution and in a second format with a second resolution higher than the first; (b) the first display being for displaying images with the first resolution and the second display being for displaying images with the second resolution; wherein the images encoded in the first format with the first resolution are to be sent over the shared resource network through a first limited bandwidth link such as for example for at least a part of the network a first cable and wherein a first part of each image encoded in the second format with the second resolution is to be sent over the shared resource network through the first limited bandwidth link such as for example the first cable and a second part of each image encoded in the second format with the second resolution is to be sent over the shared resource network through a second limited bandwidth link such as for example for at least a part of the network a second cable.

In a third aspect of the invention, a display system for displaying image data comprises (a) at least one input source encoding images to be displayed in a first format with a first resolution and in a second format with a second resolution higher than the first; (b) a first display for displaying images with the first resolution and a second display for displaying images with the second resolution; (c) a shared resource network linking the at least one input source with the first and second displays; wherein the images encoded in the first format with the first resolution are sent over the shard resource network through a first cable and wherein a first part of each image encoded in the second format with the second resolution is sent over the shared resource network through the first cable and a second part of each image encoded in the second format with the second resolution is sent over the shared resource network through a second cable.

Sending the image data in the lower resolution (which usually corresponds to an older format) over a single link can be advantageous when the decoder corresponding to a lower resolution display are not able to deal with multilink transmissions.

The images mentioned in any of the three aspects are preferably sent without being compressed. This means that the feature "part of each image encoded in the second format" refers to a part of the uncompressed image which is to be transferred. Use of uncompressed image data has the advantage that there is no need to demonstrate that the compression/decompression procedures do not introduce errors into the images which is important for medical images especially those for diagnosis.

Sending the image data in the lower resolution (which usually corresponds to an older format) over a single link can be advantageous when the receiving decoder corresponding to a lower resolution display is not able to deal with multilink transmissions.

In a further aspect of the invention, the first format is a legacy format such as an HD format and the first resolution is a legacy resolution such as 2 MP.

In a further aspect of the invention, the second format is an upgraded format such as a 4K and the second resolution is an upgraded resolution such as 8 MP.

In a further aspect of the invention, the first and second cables are 10 GE cables.

In a further aspect of the invention, a first fraction, e.g. $3/8$ of each image in the second format such as 4K format and the images in the first format such as HD images are sent through the first bandwidth limited link such as the first cable and a second fraction such as $5/8$ of each images in the second format such as the 4K format are sent through the second bandwidth limited link such as the second cable. The first and second fractions add up to 1.

It is an advantage of this aspect of the invention that only two 10 GE cables are required to stream video data in HD and 4K format in parallel.

In a further aspect of the invention, the images encoded in the second format such as the 4K format are divided in a left part and a right part. The left part of each image contains a first fraction such as $3/8$ of the pixels of that image and the right part of each image represents the remaining second fraction such as $5/8$ of that image. The entire image is reconstructed by displaying the left part and the right part of each image next to each other on a second display at the same time.

It is an advantage of that aspect of the invention that when video images are sent in parallel in the first and second resolution, the first and second cable will handle approximately the same bit rate. The risk of exceeding the bandwidth of one of the cable is thereby reduced. In a further aspect of the invention, a first fraction such as $3/8$ of each image encoded in the second format such as the 4K format is sent as a first stream over the network and the remaining second fraction such as $5/8$ of each image encoded in the second format such as the 4K format is sent as a second stream over the network.

In accordance with an aspect of the present invention the higher resolution 4K network stream is split into 2 different streams with different addresses. This means that the entire higher resolution video 4K video will not be sent as one stream. Encoders and decoders do not need special configurations on the switch ports. A further advantage is that switches can be used having a limitation on the ports that can be configured for link bonding usage.

Standard Ethernet switches use address hashing to determine which link a packet has to be sent on. Packets of the same stream have different addresses so that the data of this stream is split on the 2 network connections, thus preventing a bandwidth overflow.

Whereas some Ethernet switches can be configured to use round robin load distribution for link aggregation, this has the disadvantage that packets will arrive out-of-order whereas embodiments of the present invention do not exhibit this problem.

The decoding engines which can be used with the present invention are capable of processing 10 Gb/s independently of each other, leading to a more scalable solution.

However the present invention is not limited to 10 Gb/s cable. In further embodiment of the present invention, 40 G cabling can be used instead of 10 G cabling and can support 8K, 4K and HD resolution at a time when 8K has become a legacy resolution.

On the first cable, a first fraction of an 8K image is sent, e.g. 4/6 of an 8K image, whereas on the second cable the remainder of the 8K (e.g. the fraction 2/6) as well as 5/8 and 3/8 of 4K (to allow for support on legacy 4K decoders). HD could also be supported (for support on legacy HD decoders).

In a further embodiment, a 12 MP (megapixel) source on 3 10 G cable connections. This is done as follows:
First cable—a first fraction, e.g. 5/12 of 12 MP is sent.
Second cable—a second fraction e.g. 5/12 of 12 MP is sent.

In another aspect the present invention provides, an encoding engine for encoding images from at least one input source, the images having a first format with a first resolution and in a second format with a second resolution higher than the first; the encoding engine having means for sending images encoded in the first format with the first resolution over a shared resource network through a first limited bandwidth link such as a first cable and for means for encoding a first part of each image having the second format with the second resolution for sending over the shared resource network through the first limited bandwidth link such as the first cable and a second part of each image encoded in the second format with the second resolution for sending over the shared resource network through a second limited bandwidth link such as a second cable. The encoding engine can be embedded in an encoder or could be embedded in other apparatus for example in a camera that is the source of the images.

In another aspect the present invention provides, a decoding engine for decoding images received from at least one input source, the images having a first format with a first resolution and in a second format with a second resolution higher than the first; the decoding engine having means for decoding received images encoded in the first format with the first resolution over a shared resource network through a first limited bandwidth link such as a first cable and means for decoding a first part of each received image having the second format with the second resolution sent over the shared resource network through the first limited bandwidth link such as the first cable and means for decoding a second part of each received image encoded in the second format with the second resolution sent over the shared resource network through a second limited bandwidth link such as a second cable.

The decoding engine can be embedded in a decoder or could be embedded in other apparatus for example in a display that is configured to display the two images with different resolutions.

In another aspect of the present invention a computer program product is provided comprising software which when executed on a processing engine is adapted to encode and send images encoded in the first format with the first resolution over a shared resource network through a first limited bandwidth link such as a first cable and to encode a first part of each image having the second format with the second resolution sending over the shared resource network through the first limited bandwidth link such as the first cable and a second part of each image encoded in the second format with the second resolution for sending over the shared resource network through a second limited bandwidth link such as a second cable.

In another aspect of the present invention, a computer program product is provided comprising software which when executed on a processing engine is adapted, to decode received images encoded in the first format with the first resolution over a shared resource network through a first limited bandwidth link such as a first cable and to decode a first part of each received image having the second format with the second resolution received over the shared resource network through the first limited bandwidth link such as the first cable and to decode a second part of each received image encoded in the second format with the second resolution received over the shared resource network through a second limited bandwidth link such as a second cable.

The software mentioned above can be stored on a non-transitory signal storage medium, such as an optical disk (CD-ROM or DVD-ROM); a magnetic tape, a magnetic disk, a ROM, or a solid state memory such as a USB flash memory or similar.

DESCRIPTION OF THE PREFERRED EMBODIMENTS

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Elements or parts of the described devices may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

Figure 3:
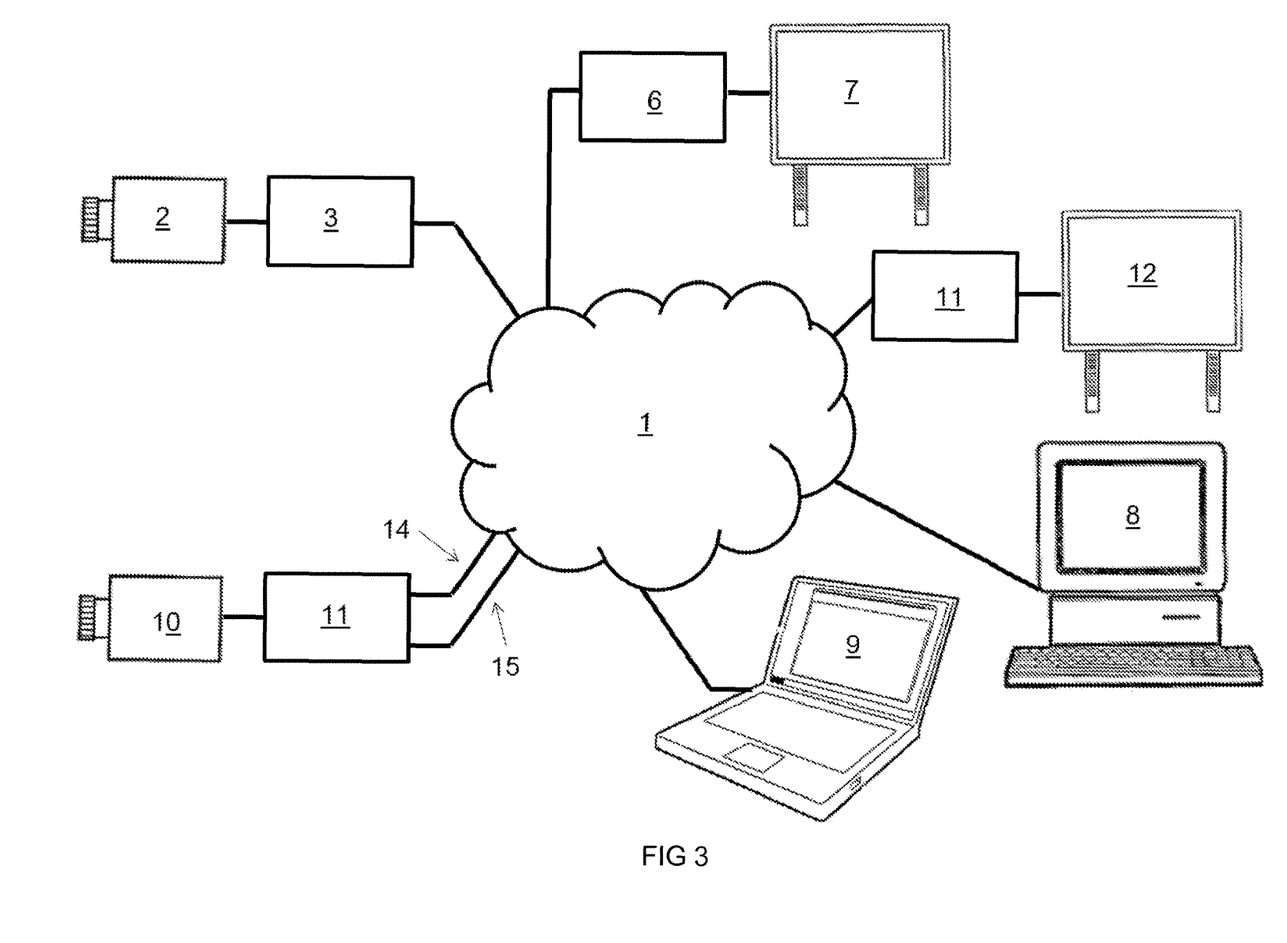
FIG. 3 shows a video network in accordance with an embodiment of the present invention.

An example of embodiment of the present invention can be seen on FIG. 3 that shows how an existing networked display system can be upgraded from legacy displays and image sources such as cameras or optical disks with a first resolution, to include upgraded displays and image sources such as cameras or optical disks, the displays being capable of displaying images with a second resolution (typically with a higher resolution) such as 4 k displays and cameras or optical disks.

Figure 4:
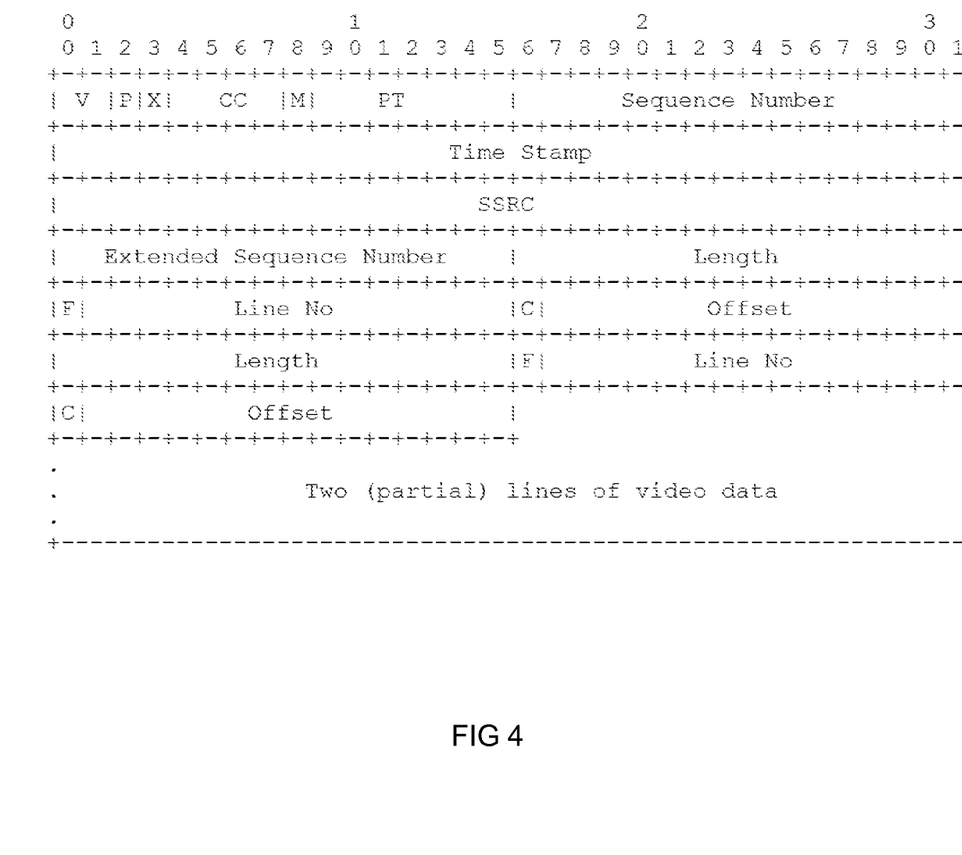
FIG. 4 shows the format of data packets generated by an encoder in accordance with another embodiment of the present invention.

An image source such as camera 2 generating images with a resolution of 2 MP (Million Pixels) at a rate of 30 to 60 frames per second or other image sources such as stored images on optical disks that store images with a resolution of 2 MP (Million Pixels) that can be streamed at a rate of 30 to 60 frames per second, is/are connected to an AV to IP encoder 3. The AV-to-IP encoder 3 (like e.g. the MNA-120 from Barco N.V. Belgium) takes in baseband video data and converts that video data without compression to an IP stream for transportation over a standard high but limited bandwidth IP network 1. The encoder is connected to the network 1 by means of a first limited bandwidth link such as a first cable 13 of a sufficient bandwidth to allow the streaming of images with the first resolution such as a resolution of 2 MP at a rate of 30 to 60 frames per second. The first limited bandwidth link such as cable 13 is for instance a 10 GE (Gigabit Ethernet) cable. Each image consists of N1 lines, each line being formed by M1 pixels. For an image with 1920000 pixels, for instance N1 can be equal to 1200 and M1 can be equal to 1600. The data packets generated by the encoder typically have a format as shown on FIG. 4.

A second image source such as a camera 10 generating images with a resolution of 8 MP (Million Pixels) at a rate of 30 to 60 frames per second or another image source such as stored images on an optical disk with a resolution of 8 MP (Million Pixels) that can be streamed at a rate of 30 to 60 frames per second is connected to an AV-to-IP encoder 11. The AV-to-IP encoder 11 takes in baseband video data and converts that video data without compression to suitable packets such as TCP/IP compliant data packets to be sent over the network 1. In addition, the AV-to-IP encoder 11 optionally converts the same video data to a downscaled video data such as video data with the first resolution, i.e. of a lower resolution, in this case 2 MP, and converts the downscaled video data to packets such as TCP/IP compliant data packets to be sent over the network 1. The data packets generated by the encoder typically have a format as shown on FIG. 4.

The AV-to-IP encoder 11 is connected to the network 1 by means of 2 second and third limited bandwidth links such as second and third cables 14 and 15 of sufficient bandwidth to allow the streaming of images with a resolution of 8 MP and 2 MP in parallel at a rate of 30 to 60 fps. The network 1 can be a single unified network or can comprise different links of which two links are the cables 14 and 15. Other links within the network may be wireless links, point-point microwave links or similar provided they have the required bandwidth. These other links will generally be transparent.

The inventor discovered that it was possible to send uncompressed video data at two different resolutions (2 MP and 8 MP) in parallel over 2 limited bandwidth links such as two cables without adding excessive lag between image capture and display of that image, thereby allowing the upgrade of existing networked display systems originally conceived for the streaming of video images with a legacy (e.g. lower) resolution of 2 MP at a rate of 30 to 60 fps.

The data packets encoding the downscaled images with a first resolution, e.g. the resolution of 2 MP are sent on a single link through the second cable 14.

The data packets encoding the images with a second resolution such as a resolution of 8 MP are sent over two links. A certain first fraction, e.g. three eighth of the data packets encoding the second resolution images such as the "4K" images are sent over the second bandwidth limited link such as the second cable 14; and the remaining fraction such as five eighth of the data packets encoding the second resolution images such as the 4K images are sent over the third cable 15. This is done with e.g. a dual link connection between the encoder 11 and a receiver connected through the network 1. The sum of the fractions is "1".

Each image with a resolution of 8 MP consists of N2 lines, each line being formed by M2 pixels. For an image with 8847360 pixels, we can have for instance N2=2160 and M2=4096.

In a particular embodiment of the present invention, each data packet sent over the second limited bandwidth link such as the second cable 14 contains information over the first fraction such as ⅜×M2 pixels of two successive lines and each data packet sent over the third limited bandwidth link such as the third cable 15 contains information over the second fraction or last ⅝×M2 pixels. This is advantageous when images with 2 MP and 8 MP are streamed in parallel by the same encoder 11. In that case, both cables will carry 5 MP. This corresponds with a bit rate of 5 MP×60 frames per second×24 bit per pixel=7.2 Gb/s.

Each cable can thus deal with additional data packets (e.g. metadata, command signals . . . ) without risk of being saturated.

Another advantage of that particular distribution of the data packets is that an "old" or legacy IP-to-AV decoder 6 like e.g. the MNA-DEC 120 from Barco N.V. Belgium is not able to deal with multiple streams. In other words, some legacy decoders are not able to reconstruct the video images correctly (if at all) if the data packets encoding those video signals are sent over multiple links. To avoid that problem, it is thus advantageous to send the data packets encoding the video signals in the older (legacy low resolution) format over a single link.

Figure 5:
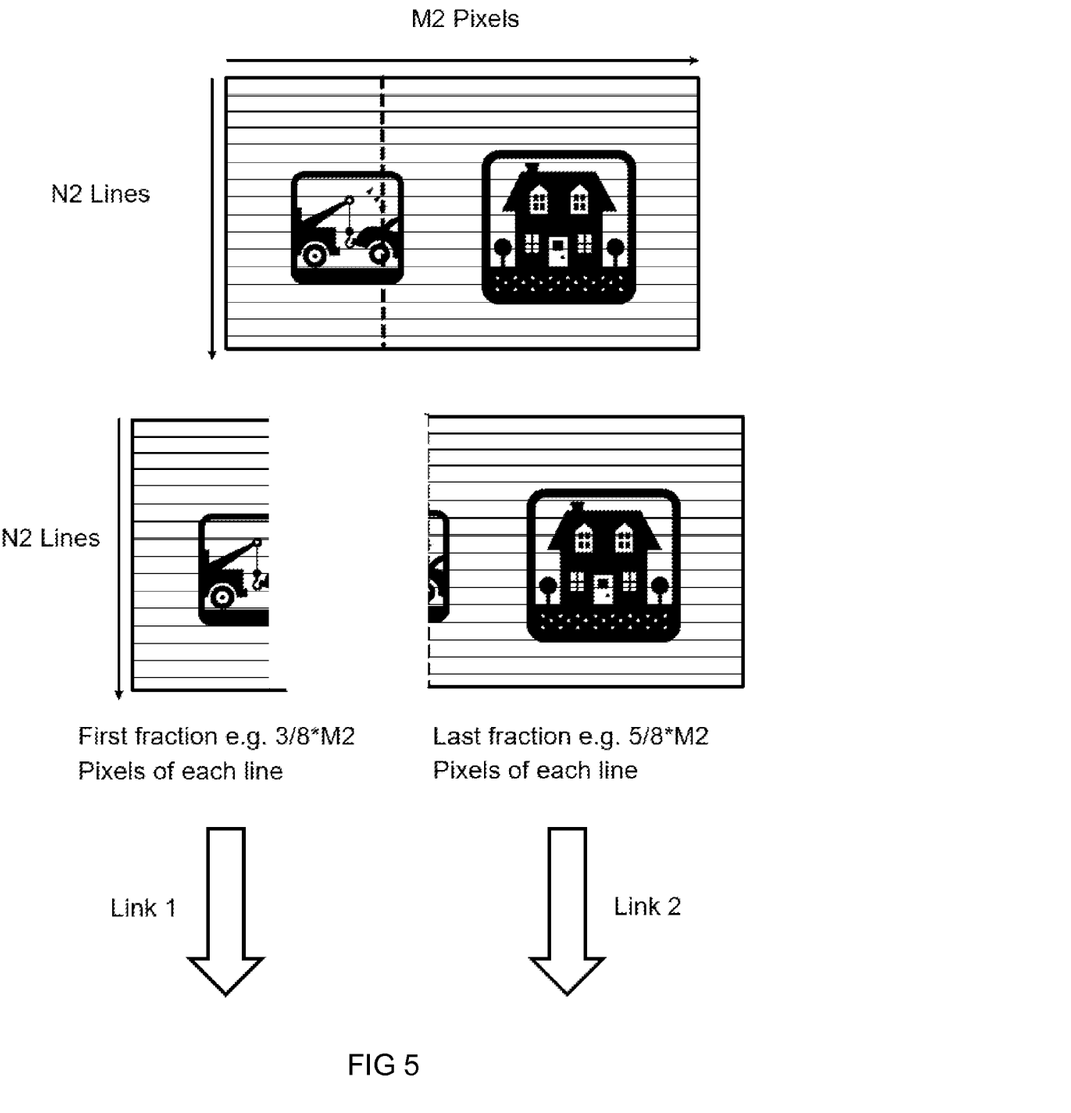
FIG. 5 shows a right part and a left part of an image are encoded in accordance with another embodiment of the present invention.

In this particular embodiment, the data packets sent over the second limited bandwidth link such as the second cable 14 encode a left part of an image while the data packets sent over the third limited bandwidth link such as the third cable 15 encode a right part of an image as shown on FIG. 5.

The data packets sent over the first cable and first link contain information over the first $3/8*M2$ pixels of each of the N2 lines. The data packets sent over the second cable and second link contain information on the last $5/8*M2$ pixels of each of the N2 lines.

The data packets are for instance formatted according to the RFC 4175 scheme. In that scheme, each line segment is characterized by its length, the line number of the line it belongs to and an offset. The offset specifies where on the line the segment starts.

Table 1 gives an overview of the parameters used to packetize the image data in the first link and the second link in accordance with an embodiment of the present invention.

Link 1 is characterized by a first IP address A. Link 2 is characterized by a second IP address B.

The timestamp and SSRC field are identical for the 2 streams and are calculated as described in the RFC4175. Sequence numbering of the RTP packets is done individually on the 2 streams. As the 2 streams can follow different paths on the network, there can be a large amount of reordering of packets between the two streams, while the amount of reordering within the same stream is limited (usually none). Both sides of the video can now be decoded independently.

In a network stream compliant to RFC4175, the offset of the first packet of a scan line is usually zero. In case the video is split into 2 streams, the width of the left stream is added to each of the offsets of the right stream. This has the advantage that the right stream can be decoded independently of the left stream.

The last packet of a particular stream is indicated with a marker bit. A decoder receiving video which is split into two streams has to wait for both markers to conclude the entire video frame is received.

As a summary this is how a decoding engine (see below for further details) can work in accordance with an embodiment of the present invention:
  Receive both the left side and the right side image streams.
  Process both streams, optionally independent from each other, for example both decoder engines share a video memory buffer which is large enough for the entire video.
  When both the left stream and the right stream have received a marker, the entire video frame is complete. The decoder engine processing the left stream has now filled the shared video memory buffer at the left side; the decoder engine processing the right stream has filled the shared video memory buffer at the right side.

Further Embodiment with Higher Resolutions

The present invention is In general applicable to all kinds of problems relating to the streaming of images with different resolutions, such as HD, UHD, 4K, 8K etc.

For example, the present invention is not limited to 4K and HD resolution.

More generally, there is often a need to send higher resolution images over a network that is configured to generate, transmit and display lower resolution legacy images.

A further embodiment of the present invention for example, uses 40 G cabling instead of 10 G cabling and can support 8K, 4K and HD resolution at a time when 8K has become a legacy resolution.

On the first cable, a first fraction of an 8K image is sent, e.g. $4/6$ of an 8K image, whereas on the second cable the remainder of the 8K (e.g. the fraction $2/6$) as well as $5/8$ and $3/8$ of 4K (to allow for support on legacy 4K decoders). HD could also be supported (for support on legacy HD decoders).

In a further embodiment, a 12 MP (megapixel) source on 3 10 G cable connections. This is done as follows:
First cable—a first fraction, e.g. $5/12$ of 12 MP is sent.
Second cable—a second fraction e.g. $5/12$ of 12 MP is sent.
Third cable—the balance e.g. $2/12$ of 12 MP+downscaled 3 MP is sent.

This further embodiment would be applicable in a radiology oriented environment for example.

Further Embodiments—Encoder and Decoder

In accordance with an embodiment of the present invention, an encoding engine is provided for encoding images from at least one input source. The encoding engine can include one or more microprocessors, processors, controllers, or a central processing unit (CPU) and/or a Graphics Processing Unit (GPU), and can be adapted to carry out functions by being programmed with software, i.e. one or more computer programmes. The encoding engine may have memory (such as non-transitory computer readable medium, RAM and/or ROM), an operating system ruinning on a micro processor, optionally a display such as a fixed format display, data entry devices such as a keyboard, a pointer device such as a "mouse", serial or parallel ports such as I/O ports to communicate with other devices, or network cards and connections to connect to any of the networks or to peripheral devices. The encoding engine may be embedded in another device such as a camera or may be a stand alone device.

The images encoded by the encoding engine have a first format with a first resolution and in a second format with a second resolution higher than the first; the encoding engine having means for sending images encoded in the first format with the first resolution over a shared resource network through a first limited bandwidth link such as a first cable and for means for encoding a first part of each image having the second format with the second resolution for sending over the shared resource network through the first limited bandwidth link such as the first cable and a second part of each image encoded in the second format with the second resolution for sending over the shared resource network through a second limited bandwidth link such as a second cable.

The first format can be a legacy format and the first resolution can be a legacy resolution. For example, the first format can be an HD format and the first resolution can be 2 MP. The second format can be an upgraded format and the second resolution can be an upgraded resolution. For example the second format can be 4K and the second resolution can be 8 MP. The first and second cables can be 10 GE cables.

The encoding engine can be adapted to send a first fraction of each image in the second format and the images in the first format through the first bandwidth limited link and a second fraction of each image in the second format through the second bandwidth limited link, whereby the first and second fractions add up to 1. These images are not compressed. The first fraction can be ⅜ of each image in the second format and the second fraction can be ⅝ of each image in the second format.

The encoding engine is adapted for use with two 10 GE cables being required to stream video data in the first and second formats whereby the first and second formats can be HD and 4K formats respectively.

The encoding engine can be adapted to separate the images encoded in the second format in a left part and a right part. The left part of each image can contain a first fraction such as ⅜ of the pixels of that image and the right part of each image represents the remaining second fraction such as ⅝ of that image. A first fraction of each image encoded in the second format can be sent as a first stream over the network and the remaining second fraction of each image encoded in the second format can be sent as a second stream over the network. The encoding engine can be adapted to send video images in parallel having the first and second resolution, and the first and second limited bandwidth links handle approximately the same bit rate.

In accordance with another embodiment of the present invention, a decoding engine is provided for decoding images from at least one input source. The decoding engine can include one or more microprocessors, processors, controllers, or a central processing unit (CPU) and/or a Graphics Processing Unit (GPU), and can be adapted to carry out functions by being programmed with software, i.e. one or more computer programmes.

The decoding engine may have memory (such as non-transitory computer readable medium, RAM and/or ROM), an operating system ruinning on a micro processor, optionally a display such as a fixed format display, data entry devices such as a keyboard, a pointer device such as a "mouse", serial or parallel ports such as I/O ports to communicate with other devices, or network cards and connections to connect to any of the networks or to peripheral devices. The decoding engine may be embedded in another device such as a display or may be a stand alone device.

The decoding engine is for decoding images received from at least one input source, whereby the images have a first format with a first resolution and have a second format with a second resolution higher than the first; the decoding engine having means for decoding received images encoded in the first format with the first resolution over a shared resource network through a first limited bandwidth link such as a first cable and means for decoding a first part of each received image having the second format with the second resolution received over the shared resource network through the first limited bandwidth link such as the first cable and means for decoding a second part of each received image encoded in the second format with the second resolution received over the shared resource network through a second limited bandwidth link such as a second cable.

The first format can be a legacy format and the first resolution can be a legacy resolution. The first format can be an HD format and the first resolution can be 2 MP. The second format can be an upgraded format and the second resolution can be an upgraded resolution. The second format can be 4K and the second resolution can be 8 MP. The first and second cables can be 10 GE cables. Two 10 GE cables are required to stream video data in the first and second formats whereby the first and second formats can be HD and 4K formats respectively.

The decoding engine can be adapted to decode a first fraction of each image in the second format and the images in the first format received through the first bandwidth limited link and to decode a second fraction of each image in the second format received through the second bandwidth limited link, whereby the first and second fractions add up to 1. The first fraction can be ⅜ of each image in the second format and the second fraction can be ⅝ of each image in the second format.

The decoding engine may be adapted to decode images encoded in the second format which are divided in a left part and a right part. The left part of each image can contain a first fraction such as ⅜ of the pixels of that image and the right part of each image can represent the remaining second fraction such as ⅝ of that image. A first fraction of each image encoded in the second format can be received as a first stream over the network and the remaining second fraction of each image encoded in the second format can be received as a second stream over the network. The decoding engine can be adapted to receive video images in parallel having the first and second resolution, and the first and second limited bandwidth links handling approximately the same bit rate.

The decoding engine can be adapted to reconstruct the entire image by displaying the left part and the right part next to each other on a second display.

In accordance with another embodiment of the present invention software may be implemented as a computer program product which has been compiled for a processing engine in the encoding or decoding engine described above. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The encoding software can be embodied in a computer program product adapted to carry out the following functions when the software is loaded onto the respective device or devices and executed on one or more processing engines such as microprocessors, ASIC's, FPGA's etc.

The software for encoding can be adapted to encode images having a first format with a first resolution and in a second format with a second resolution higher than the first.

The encoding software can be embodied in a computer program product adapted to carry out the following functions when the software is loaded onto the respective device or devices and executed on one or more processing engines such as microprocessors, ASIC's, FPGA's etc.:
sending images encoded in the first format with the first resolution over a shared resource network through a first limited bandwidth link such as a first cable and encoding a first part of each image having the second format with the second resolution sending over the shared resource network through the first limited bandwidth link such as the first cable and a second part of each image encoded in the second format with the second resolution for sending over the shared resource network through a second limited bandwidth link such as a second cable.

The first format can be a legacy format and the first resolution can be a legacy resolution. For example, the first format can be an HD format and the first resolution can be 2 MP. The second format can be an upgraded format and the second resolution can be an upgraded resolution. For example the second format can be 4K and the second resolution can be 8 MP. The first and second cables can be 10 GE cables.

The encoding software can be embodied in a computer program product adapted to carry out the following functions when the software is loaded onto the respective device or devices and executed on one or more processing engines such as microprocessors, ASIC's, FPGA's etc.:

sending a first fraction of each image in the second format and the images in the first format through the first bandwidth limited link and a second fraction of each image in the second format through the second bandwidth limited link, whereby the first and second fractions add up to 1. These images are not compressed. The first fraction can be 3/8 of each image in the second format and the second fraction can be 5/8 of each image in the second format. The encoded images are sent via two 10 GE cables which are required to stream video data in the first and second formats whereby the first and second formats can be HD and 4K formats respectively.

The encoding software can be embodied in a computer program product adapted to carry out the following functions when the software is loaded onto the respective device or devices and executed on one or more processing engines such as microprocessors, ASIC's, FPGA's etc.:

separating the images encoded in the second format in a left part and a right part. The left part of each image can contain a first fraction such as 3/8 of the pixels of that image and the right part of each image represents the remaining second fraction such as 5/8 of that image. A first fraction of each image encoded in the second format can be sent as a first stream over the network and the remaining second fraction of each image encoded in the second format can be sent as a second stream over the network.

The encoding software can be embodied in a computer program product adapted to carry out the following functions when the software is loaded onto the respective device or devices and executed on one or more processing engines such as microprocessors, ASIC's, FPGA's etc.:

Sending video images in parallel having the first and second resolution, and the first and second limited bandwidth links handle approximately the same bit rate.

The decoding software can be embodied in a computer program product adapted to carry out the following functions when the software is loaded onto the respective device or devices and executed on one or more processing engines such as microprocessors, ASIC's, FPGA's etc.

The software for decoding images received from at least one input source, when executed on a processing engine, can decode the images having a first format with a first resolution and having a second format with a second resolution higher than the first; the decoding software being adapted, when executed on a processing engine, for decoding received images encoded in the first format with the first resolution over a shared resource network through a first limited bandwidth link such as a first cable and for decoding a first part of each received image having the second format with the second resolution received over the shared resource network through the first limited bandwidth link such as the first cable and for decoding a second part of each received image encoded in the second format with the second resolution received over the shared resource network through a second limited bandwidth link such as a second cable.

The software for decoding can be adapted to decode, when executed on a processing engine, images having a first format with a first resolution and in a second format with a second resolution higher than the first.

The first format can be a legacy format and the first resolution can be a legacy resolution. The first format can be an HD format and the first resolution can be 2 MP. The second format can be an upgraded format and the second resolution can be an upgraded resolution. The second format can be 4K and the second resolution can be 8 MP. The first and second cables can be 10 GE cables. Two 10 GE cables are required to stream video data in the first and second formats whereby the first and second formats can be HD and 4K formats respectively.

The software for decoding can be adapted to decode, when executed on a processing engine, a first fraction of each image in the second format and the images in the first format received through the first bandwidth limited link and to decode a second fraction of each image in the second format received through the second bandwidth limited link, whereby the first and second fractions add up to 1. The first fraction can be 3/8 of each image in the second format and the second fraction can be 5/8 of each image in the second format.

The software for decoding can be adapted to decode images encoded in the second format, when executed on a processing engine, which are divided in a left part and a right part. The left part of each image can contain a first fraction such as 3/8 of the pixels of that image and the right part of each image can represent the remaining second fraction such as 5/8 of that image. A first fraction of each image encoded in the second format can be received as a first stream over the network and the remaining second fraction of each image encoded in the second format can be received as a second stream over the network.

The software for decoding can be adapted to reconstruct the entire image, when executed on a processing engine by displaying the left part and the right part next to each other on a second display.

The software for decoding can be adapted to receive video images in parallel having the first and second resolution, and the first and second limited bandwidth links handling approximately the same bit rate.

The software mentioned above can be stored on a non-transitory signal storage medium, such as an optical disk (CD-ROM or DVD-ROM); a magnetic tape, a magnetic disk, a ROM, or a solid state memory such as a USB flash memory or similar.

The invention claimed is:

1. A display system for displaying image data comprising at least one input source encoding images to be displayed in a first format with a first resolution and in a second format with a second resolution higher than the first; a first display for displaying images with the first resolution and a second display for displaying images with the second resolution; a shared resource network linking the at least one input source with the first and second displays; wherein the images encoded in the first format with the first resolution are sent over the shared resource network through a first limited bandwidth link and wherein a first part of each image encoded in the second format with the second resolution is sent over the shared resource network through the first limited bandwidth link and a second part of each image encoded in the second format with the second resolution is sent over the shared resource network through a second limited bandwidth link, wherein a first fraction of each image in the second format and the images in the first format are sent through the first bandwidth limited link and a second fraction of each image in the second format are sent through the second bandwidth limited link, whereby the first and second fractions add up to 1.

2. The display system of claim 1, wherein the first format is selected from a legacy format and HD format, and the first resolution is selected from a legacy resolution and a 2 MP resolution.

3. The display system of claim 1, wherein, the second format is selected from an upgraded format and a 4K formation and the second resolution is selected from an upgraded resolution an 8 MP resolution.

4. The display system of claim 1, wherein the first and second cables are 10 GE cables.

5. The display system of claim 1 wherein two 10 GE cables are required to stream video data in the first and second formats whereby the first and second formats are HD and 4K formats respectively.

6. The display system of claim 1, wherein images encoded in the second format are divided in a left part and a right part.

7. The display system according to claim 6, adapted to reconstruct the entire image by displaying the left part and the right part next to each other on a second display.

8. The display system of claim 1, wherein a first fraction of each image encoded in the second format is sent as a first stream over the network and the remaining second fraction of each image encoded in the second format is sent as a second stream over the network.

9. A method for displaying image data, the method comprising:
at least one input source encoding images to be displayed in a first format with a first resolution and in a second format with a second resolution higher than the first;
displaying images with the first resolution and images with the second resolution on different displays;
wherein the images encoded in the first format with the first resolution are sent over a shared resource network through a first limited bandwidth link and wherein a first part of each image encoded in the second format with the second resolution is sent over the shared resource network through the first limited bandwidth link and a second part of each image encoded in the second format with the second resolution is sent over the shared resource network through a second limited bandwidth link,
wherein a first fraction of each image in the second format and the images in the first format are sent through the first bandwidth limited link and a second fraction of each image in the second format are sent through the second bandwidth limited link, whereby the first and second fractions add up to 1.

10. The method of claim 9, wherein the first format is selected from a legacy format and an HD format and the first resolution is selected from a legacy resolution and a 2 MP resolution.

11. The method of claim 9, wherein the second format is selected from an upgraded format and a 4K format and the second resolution is selected from an upgraded resolution and an 8 MP resolution.

12. The method of claim 9, wherein images encoded in the second format are divided in a left part and a right part.

13. The method according to claim 12, further comprising reconstructing the entire image by displaying the left part and the right part next to each other on a second display.

14. An encoding engine for encoding images from at least one input source, the images having a first format with a first resolution and in a second format with a second resolution higher than the first; the encoding engine having means for sending images encoded in the first format with the first resolution over a shared resource network through a first limited bandwidth link and for means for encoding a first part of each image having the second format with the second resolution for sending over the shared resource network through the first limited bandwidth link and a second part of each image encoded in the second format with the second resolution for sending over the shared resource network through a second limited bandwidth link,
wherein a first fraction of each image in the second format and the images in the first format are sent through the first bandwidth limited link and a second fraction of each image in the second format are sent through the second bandwidth limited link, whereby the first and second fractions add up to 1.

15. A decoding engine for decoding images received from at least one input source, the images having a first format with a first resolution and in a second format with a second resolution higher than the first; the decoding engine having means for decoding received images encoded in the first format with the first resolution over a shared resource network through a first limited bandwidth link and means for decoding a first part of each received image having the second format with the second resolution received over the shared resource network through the first limited bandwidth link and means for decoding a second part of each received image encoded in the second format with the second resolution received over the shared resource network through a second limited bandwidth link,
wherein a first fraction of each image in the second format and the images in the first format are sent through the first bandwidth limited link and a second fraction of each image in the second format are sent through the second bandwidth limited link, whereby the first and second fractions add up to 1.

16. A non-transitory signal storage medium, storing a computer program product comprising software which when executed on a processing engine is adapted to encode and send images encoded in the first format with the first resolution over a shared resource network through a first limited bandwidth link and to encode a first part of each image having the second format with the second resolution sending over the shared resource network through the first limited bandwidth link and a second part of each image encoded in the second format with the second resolution for sending over the shared resource network through a second limited bandwidth link,
wherein a first fraction of each image in the second format and the images in the first format are sent through the first bandwidth limited link and a second fraction of each image in the second format are sent through the second bandwidth limited link, whereby the first and second fractions add up to 1.

17. A non-transitory signal storage medium, storing a computer program product comprising software which when executed on a processing engine is adapted to decode received images encoded in the first format with the first resolution over a shared resource network through a first limited bandwidth link and to decode a first part of each received image having the second format with the second resolution received over the shared resource network through the first limited bandwidth link and to decode a second part of each received image encoded in the second format with the second resolution received over the shared resource network through a second limited bandwidth link,
wherein a first fraction of each image in the second format and the images in the first format are sent through the first bandwidth limited link and a second fraction of each image in the second format are sent through the second bandwidth limited link, whereby the first and second fractions add up to 1.

18. A display according to claim 1 wherein the first limited bandwidth link is a first cable first cable and/or the second limited bandwidth link is a second cable.

19. The method of claim 9 wherein the first limited bandwidth link is a first cable and/or the second limited bandwidth link is a second cable.

20. The encoding engine of claim 14, wherein the first limited bandwidth link is a first cable and/or the second limited bandwidth link is a second cable.

21. The decoding engine of claim 15, wherein the first limited bandwidth link is a first cable and/or the second limited bandwidth link is a second cable.

22. The non-transitory signal storage medium of claim 16 or 17, wherein the first limited bandwidth link is a first cable and/or the second limited bandwidth link is a second cable.

* * * * *